United States Patent [19]
Johansson

[11] Patent Number: 5,054,613
[45] Date of Patent: Oct. 8, 1991

[54] DEVICE FOR FIXATION OF THE SPATIAL INTERRELATIONSHIP OF UPENDED FRAMES

[76] Inventor: Evald V. Johansson, Brevduvegatan 3, S-421 69 Västra Frölunda, Sweden

[21] Appl. No.: 401,446
[22] PCT Filed: Mar. 10, 1988
[86] PCT No.: PCT/SE88/00119
§ 371 Date: Sep. 8, 1989
§ 102(e) Date: Aug. 9, 1989
[87] PCT Pub. No.: WO88/07011
PCT Pub. Date: Sep. 22, 1988

[30] Foreign Application Priority Data
Mar. 12, 1987 [SE] Sweden ................................ 8701028

[51] Int. Cl.⁵ ............................................. B65D 85/48
[52] U.S. Cl. ..................................... 206/325; 206/321; 206/454
[58] Field of Search ................................ 206/321–325, 206/449, 454, 521, 586

[56] References Cited

U.S. PATENT DOCUMENTS

| | | | |
|---|---|---|---|
| 2,489,029 | 11/1949 | Guerrant | 206/325 |
| 2,619,829 | 12/1952 | Tatum | 446/127 |
| 2,738,564 | 3/1956 | Guinane | 206/454 |
| 2,895,599 | 7/1959 | Moyer et al. | 206/454 |
| 3,410,474 | 11/1968 | Keil | 206/586 |
| 3,655,034 | 4/1972 | Stollman et al. | 206/454 |
| 3,662,486 | 5/1972 | Freedman | 446/120 |
| 3,955,676 | 5/1976 | Hansen et al. | 206/454 |
| 4,823,952 | 4/1989 | Fletcher | 206/454 |

FOREIGN PATENT DOCUMENTS

| | | | |
|---|---|---|---|
| 0270512 | 6/1988 | European Pat. Off. | 206/454 |
| 2609695 | 1/1987 | France | 206/586 |

Primary Examiner—Jimmy G. Foster
Attorney, Agent, or Firm—Harness, Dickey & Pierce

[57] ABSTRACT

A device for fixation of the spatial interrelationship of upended and somewhat spaced apart frames is used in e.g. complete windows, including the frame, casement and window-panes.

The device consists of a connection member which is arranged to be attached to the outer edge face of the frame. The connection member comprises a cross bar serving as an insert between two juxtaposed frames, and an interconnecting part of the member is arranged to be inserted into a recess formed in an adjacent connection member which is attached to a frame adjacent the first-mentioned frame. The interconnecting part and the recess are designed to matingly engage to interlock the connection members and consequently the frames.

6 Claims, 2 Drawing Sheets

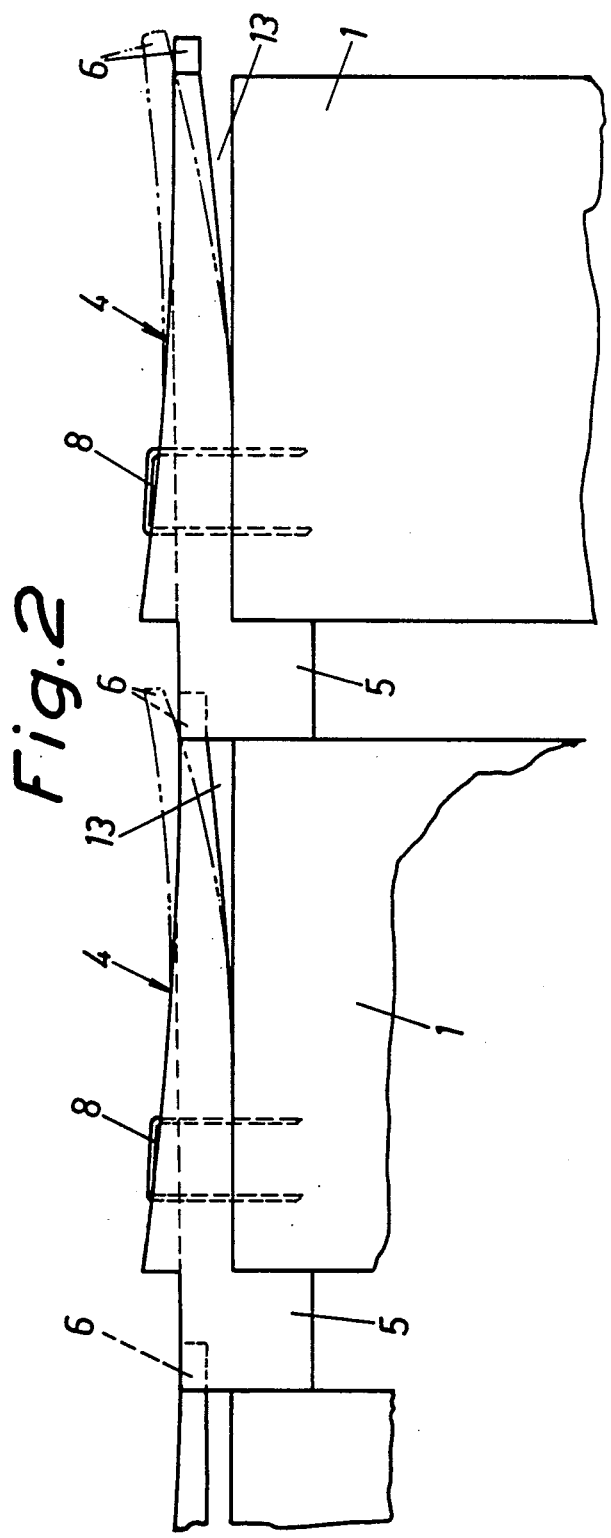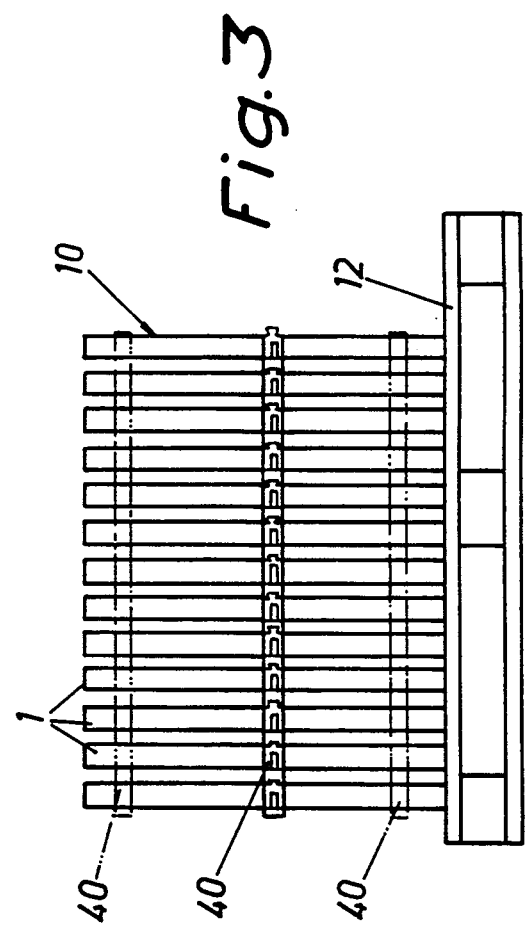

DEVICE FOR FIXATION OF THE SPATIAL INTERRELATIONSHIP OF UPENDED FRAMES

BACKGROUND OF THE INVENTION

The subject invention concerns a device for fixation of the spatial interrelationship of upended and somewhat spaced apart frames, e.g. window frames including casement and window-panes.

After the manufacture of complete windows, that is including the frame, casement, window panes, hinges and fasteners, they are assembled in groups in the factory in an upended position and spaced somewhat apart, with battens positioned between the individual windows to prevent painted surfaces from scuffing or rubbing against each other and to accommodate projecting hinges and fastening mechanisms. Each group of windows thus disposed in an erected position is encircled by straps to form a package unit.

The package units thus formed are then transported in the conventional manner to a storage serving as an intermediate station, from which storage windows are delivered to the purchaser when ordered. Such purchasing orders may be for a specified number of windows of one design and another specified number of windows of a different design and/or size, with the result that different package units of windows of various designs and/or sizes must be opened in order to execute the order. The remaining windows of each package unit must then be re-assembled and re-strapped for protection of the windows as it would be too expensive to store each window in individual stands. Battens cut to size are therefore positioned as cross bars alongside two opposite outer sides of a group of windows and are secured to the window edge faces with the aid of fastener or stapler guns. The windows which are to be delivered to the purchaser are grouped together and secured in the same manner. The procedure may have to be repeated upon execution of each new order, which means that the battens have to be broken away from the window edge faces, the required number of ordered windows be withdrawn from the group, and the battens be recut to match the smaller unit of remaining windows and again be stapled to the window edge faces.

The execution of an order consequently involves considerable work. In addition, the storesman exposes himself to certain risks of being injured by the pointed parts of the staples—inserted into the window edges by staplers—which often project from the window frames. Furthermore, the consumption of battens in times becomes considerable, since the battens must be cut to size repeatedly for adjustment to package units of new dimensions and for this reason each batten can only be used a couple of times.

SUMMARY OF THE INVENTION

The subject invention provides a device by means of which grouped-together windows may be handled with more ease and convenience while at the same time material savings of wood are achieved. The device in accordance with the invention is characterized by the provision of a connection member which is arranged to be attached to the outer face of a frame, said connection member comprising a cross bar serving as an insert between two juxtaposed frames, and an interconnecting part which is arranged to be inserted in a recess formed in an adjacent connection member attached to a frame juxtaposed to the first frame, said interconnecting part and said recess designed to matingly engage, thus interlocking the two connection members and consequently the two frames.

BRIEF DESCRIPTION OF THE DRAWINGS

The invention will be described in closer detail in the following with reference to the accompanying drawings, wherein FIG. 2 illustrates two connection members in a view from above, which members likewise are used to interconnect two juxtaposed frames, and FIG. 3 illustrates, on a considerably reduced scale, a package unit consisting of a number of grouped-together frames which are interconnected as a unit with the aid of a number of connection members in accordance with the invention.

DETAILED DESCRIPTION OF A PREFERRED EMBODIMENT

Figure 1:
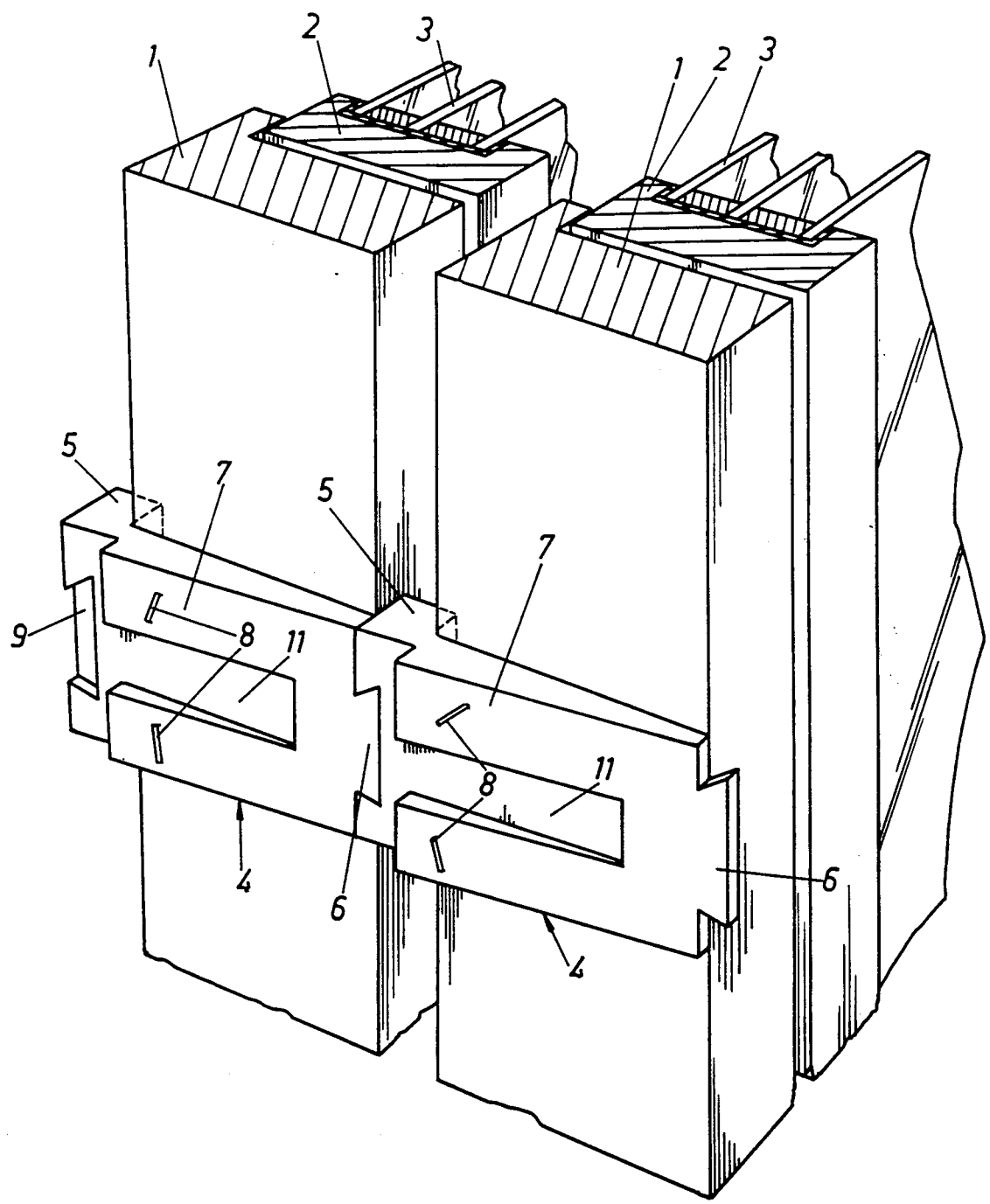
FIG. 1 is a perspective view of two connection members in accordance with the invention for interconnecting two juxtaposed frames.

To illustrate the use of the connection member in accordance with the invention has been chosen its application to form package units of grouped together, complete windows comprising a frame 1, a casement 2 and window-panes 3, as appears from FIG. 1. Obviously, the inventive object, the connection member, may be used also for other types of frames, such as door-frames or indeed any type of frames that for some reason need to be positioned upended, spaced a short distance apart.

The connection member 4 essentially consists of a cross bar 5, an interconnecting part 6 and an intermediate attachment part 7 by means of which the connection member is attached to the frame 1 for instance by means of staples or cramps 8. The cross bar 5 is intended to serve as an insert between two juxtaposed frames 1 and thus replaces the spacing battens mentioned in the aforegoing. The interconnecting part 6, which has a dovetail configuration in the embodiment shown in the drawing figures, is arranged to nest in and engage with a recess 9 of matching configuration which is formed in an adjoining connection member 4. The dovetail configuration forms an interlocking joint by means of which the individual connecting members 4 in a row of such members are interconnected.

FIG. 3 illustrates a group 10 of window frames 1 disposed in an upended position and interconnected in the form of a package unit by means of a row 40 of individually interconnected connection members 4 in accordance with the invention. Each one of these members may, as illustrated in FIG. 1, be formed with a longitudinal groove 11. Together, these grooves 11 serve to guide a strap (not shown) which could be made to encircle the entire package unit for added security, particularly when the number of frames in the group is large. A thus integral group of frames is then transported as a unit on a pallet 12 from the manufacturer to a storage or—which is of course also possible—straight to the consumer.

When a number of windows is to be separated from the group 10 and to be delivered to the consumer, the strap, if such is used around the group, is removed. As indicated in FIG. 2 by dash-and-dot lines, the portion of the connection member 4 positioned adjacent the interconnecting part 6 is transversely resilient and so positioned that a gap 13 is formed between this transversely resilient connection member portion and the frame 1. By inserting a tool into this gap 13 between one of the connection members 4 in the row 40 and the associated frame 1 and resiliently push the connection member outwards, disengaging the interconnecting part 6 thereof from the recess 9 in the adjacent connection member, the latter connection member is released, allowing the frame associated therewith to be turned away somewhat. The same procedure is repeated at the opposite side of the group 10, and the desired number of windows is thus separated from the group.

The separated group consists of interconnected windows, and the entire group need only be transferred onto another pallet 12 and thereafter be conveyed to the purchaser. The remaining windows in the group are also interconnected and therefore may be deposited on a storage shelf as one integral unit.

As described in the aforegoing the handling of the windows in this manner is very easy and convenient. The battens mentioned initially and inserted between neighbouring windows as spacer means become superfluous. There is not either any need to use the cross bars to interconnect the windows and therefore no need for the batten nailing, breaking up and cutting operations that the use of cross bars for interconnecting purposes has hitherto involved. Consequently, individual windows need practically never be handled separately and grouped together to form new units. Instead, in all situations the windows are handled as integral groups. However, orders involving only one single window are easily executed, since it is just as easy to separate one single window as several windows from a group 10.

When a group of windows are received by the purchaser the latter separates the individual windows in the group in exactly the same manner as described above. One or a couple of connection members 4 remain attached to opposite edge faces of each window frame 1. As appears above all from FIG. 1 the connection member 4 is wedge-shaped, allowing it to be used as a securing block or cleat when the individual windows are to be inserted into the openings made in the building body for that purpose. The connection members thus replace the conventional wedge blocks used in building to align a window in its associated opening.

Owing to its design and arrangement the connection member 4 thus serves an important secondary function at the site of use and therefore need not be returned or discarded after having been used as a connection means.

The device in accordance with the invention is not limited to the embodiment as shown and described but could be modified in many ways within the scope of the appended claims. The connection member 4 could have a different appearance and a different configuration. This applies for instance to the interconnecting part 6 and the recess 9. Instead of the gap 13 the connection member 4 may be formed with a recess in the surface facing the frame 1 into which recess a tool may be inserted.

As indicated in dash-and-dot lines in FIG. 3 a group 10 of frames could be provided with several rows 40 of connection members 4, the number of rows depending on the height of the frames 1.

What I claim is:

1. An improved device for fixation of a spatial interrelationship of upended, spaced apart frame, said device comprising an elongated, generally wedge-shaped connection member extending from a thicker end to a thinner end; said connection member including a cross-bar insert protruding from said thicker end transversely to the elongated direction of the connection member, an interconnecting recess at said thicker end, and an interconnecting part at said thinner end, wherein said recess and said part are configured such that said part is capable of interlocking with a like recess of an identical connection member for the purpose of interlocking plural connection members.

2. A device as claimed in claim 1 wherein the part of the connection member which is nearer the interconnecting part is resiliently flexible.

3. The device as claimed in claim 1 wherein the surface nearer the interconnecting part tapers away from the surface of said connection member nearer the cross bar insert.

4. The device as claimed in claim 1, wherein the interconnecting part is in the shape of a dovetail and the recess formed in the cross bar has a mating configuration.

5. A device as recited in claim 1 wherein said connection member has a longitudinal groove adapted to guide a strap.

6. The device as recited in claim 1 wherein said connection member is adapted to be attaching to the outer face of said frame by stapling.

* * * * *